United States Patent [19]

Bobrov et al.

[11] Patent Number: 4,595,817

[45] Date of Patent: Jun. 17, 1986

[54] METHOD OF MECHANICAL MACHINING OF WORKPIECES USING A PLASMA ARC TO HEAT THE CUTTING ZONE

[76] Inventors: Alexandr V. Bobrov, 2 Schukinsky proezd, 8, kv. 15; Valery V. Zabegalov, ulitsa Marshala Koneva, 4, kv. 18, both of Moscow; Anatoly P. Zabasnenko, ulitsa Lenina, 27, kv. 16, Pavlograd, Dnepropetrovskaya oblast; Nikolai S. Ivchenko, ulitsa Fabrichno-Zavodskaya, 120, kv. 36, Dnepropetrovsk; Lev P. Litvinov, Leninsky prospekt, 12, kv. 32, Moscow; Jury A. Papov, Fergansky proezd, 17, korpus 2, kv. 96, Moscow; Alexandr F. Seregin, ulitsa Katukova, 16, korpus 2, kv. 213, Moscow; Leonid A. Zhukov, ulitsa Shirokaya 5, korpus 1, kv. 47, Moscow; Olga S. Gaponenko, ulitsa Vishnevaya, 10, kv. 5, Skhodnya, Moskovskaya oblast; Alexandr V. Tkachenko, deceased, late of Moscow; by Elena V. Tkachenko, administrator, ulitsa Magnitogorskaya 3, kv. 17, Moscow; Alexandr I. Telenkov, ulitsa Kukhmisterova, 18, kv. 171, Moscow; Vladimir I. Smychnikov, Zagorodny proezd, 7, korpus 2, kv. 58, Moscow, all of U.S.S.R.

[21] Appl. No.: 680,253

[22] PCT Filed: Mar. 25, 1983

[86] PCT No.: PCT/SU83/00007

§ 371 Date: Nov. 26, 1984

§ 102(e) Date: Nov. 26, 1984

[87] PCT Pub. No.: WO84/03648

PCT Pub. Date: Sep. 27, 1984

[30] Foreign Application Priority Data

Dec. 12, 1977 [SU] U.S.S.R. .............. 2552691
May 17, 1979 [SU] U.S.S.R. .............. 2766102

[51] Int. Cl.⁴ ................................... B23K 9/00
[52] U.S. Cl. .................. 219/121 PY; 219/121 PB; 219/121 PM; 148/9 R
[58] Field of Search ....... 219/121 PY, 121 P, 121 PB, 219/121 PM, 68, 74, 75, 123, 121 PA; 148/9 R, 9.5

[56] References Cited

U.S. PATENT DOCUMENTS 4,139,757  2/1979  Sipek .................. 219/121 PY

FOREIGN PATENT DOCUMENTS 1351140  4/1974  United Kingdom .
588062   1/1978  U.S.S.R. .
0944792  5/1980  U.S.S.R. .
856717   8/1981  U.S.S.R. .

*Primary Examiner*—M. H. Paschall
*Attorney, Agent, or Firm*—Fleit, Jacobson, Cohn & Price

[57] ABSTRACT

This invention relates generally to machine engineering, and more particularly to methods of thermomechanical machining with plasma arc heating of the cutting zone.

The method according to the invention can be used with advantage for rough-machining high-strength and hard metals, including such active metals as titanium and titanium alloys.

The method resides in that conditions of heating the workpiece surface to be cut and positioning of the plasma arc are selected depending on predetermined cutting conditions and dimensions of the surface to be cut.

3 Claims, 5 Drawing Figures

METHOD OF MECHANICAL MACHINING OF WORKPIECES USING A PLASMA ARC TO HEAT THE CUTTING ZONE

FIELD OF THE INVENTION

This invention relates generally to machine engineering, and more particularly to thermomechanical machining with plasma arc preheating of the surface to be cut.

BACKGROUND OF THE INVENTION

There is known the "Cutfast" high-speed method of thermomechanical machining developed by the PERA Company of Great Britain. In this method the surface being removed is preheated by a plasma arc with the anode spot located in advance of the cutting tool.

This method resides in localized preheating of the surface to be cut by a plasma arc and substantially simultaneous chip removal. Heat resistant tools are employed, since cutting is effected in the heat-affected zone.

However, the process is costly and its application is inherently limited because of the employment of pure argon as a plasma-forming gas.

Machining efficiency in this method is improved by increasing the cutting speed at invariable or even reduced tool feed compared with machining without heating. In turn, this increase in the cutting speed makes it impossible to machine heavy unbalanced workpieces having an eccentricity, since such an increase in the cutting speed leads to greater impact loads and results in premature wear and failure of the tool. Also, increased workpiece rotation speed and the accompanying impact loads entail faster wear of the equipment.

The above method fails to provide for machining many active metals, such as titanium and its alloys, because the thin chip heated to a very high temperature becomes self-inflammable as a result of the exothermic reaction when the chip is oxidized by the air. Further, in the "Cutfast" process tool life is reduced because it is in continuous contact with the alpha-layer in the zone of the anode spot.

In view of the foregoing, this known method is intended for machining by a single-edged cutting tool with small depth and width of cut.

SUMMARY OF THE INVENTION

The invention is directed toward the provision of a thermomechanical machining method with such a selection of operating conditions in terms of heating by plasma arc of the surface to be removed and chip removing which would be characterized by a greater depth of cut to enable machining with a higher efficiency and longer tool life, of unbalanced workpieces of heavy weight having a certain amount of eccentricity including workpieces of such active metals as titanium and its alloys.

This has been attained in that in a method of thermomechanical machining whereby the surface to be removed by a cutting tool is preheated by a plasma arc with the anodic spot localization in advance of the cutting tool, and whereby, according to the invention, the parameters of heating and positioning of the anodic spot are selected depending on the desired conditions and depth of cutting, having in view the fact that greater depth of heating improves machinability.

The selection of preheating and cutting conditions provides for uniform heating of the workpiece surface to be removed to a required temperature, which in turn enables an increase in the depth of cut. This eventually makes it possible to machine unbalanced heavy workpieces having a certain amount of eccentricity with a higher efficiency without resorting to increased cutting speeds.

Such an increase in the depth of cut also makes it possible to machine workpieces of such active metals as titanium and titanium alloys without chip self-inflammation.

The thus preselected conditions of preheating and cutting enable the reduction of the effect of impact loads acting on the cutting tool as well as to obviate the effect of the alpha-layer formed in the region of the anodic spot on the tool to result in a longer life of the tool.

In the ease of using a plasma arc with a stationary anodic spot, it is preferable that the anodic spot size in terms of the width of cut be less than the width of cut by a value of from 1.2 to 2.5 the selected depth of cut, the cutting tool being preferably spaced from the anodic spot at a distance substantially equal to a product of the speed of cutting by the time of preheating of the surface to be cut.

The above selection of the size of the anodic spot and positioning of the cutting tool provides for the equalization of temperature in the zone of cutting within the time during which the portion of the workpiece preheated by the anodic spot reaches the cutting tool at a given rotational speed of the workpiece being machined, which ensures uniform preheating of the workpiece both in terms of the width and the depth of cut.

Such a uniform preheating optimizes the conditions of cutting and reduces tool wear.

In another modified form of the hereinproposed method, particularly when using a plasma arc with oscillating anodic spot, it is preferable that the width of cut be greater than the amplitude of the anodic spot oscillations by the sum of values of the size of the anodic spot in terms of the width of cut and 1.2 and 2.5 the depth of cut, the speed of cutting being preferably substantially equal to the product of the frequency of oscillations of the anodic spot by the size of the anodic spot in terms of the width of cut.

Such selection of the width of cut and cutting speed results in an increased cutting width to be done particularly by a multipoint tool, such as a milling cutter.

To optimize the use of heat power developed by the plasma arc, the latter is preferably positioned such that its longitudinal axis coincides with the direction of movement of the workpiece at an acute angle to its vector which provides for heating of the workpiece surface to be removed short of blowing the molten metal off the surface thereof, that is, all the heat developed by the plasma arc is expended for heating the metal in the zone of cutting.

BEST MODE OF CARRYING OUT THE INVENTION

Figure 1:
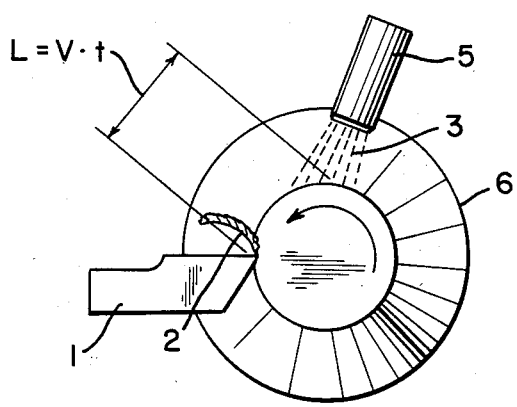
FIG. 1 is an end view of a cutting tool and rotatable cylindrical workpiece, together with a plasma arc, in accordance with the present invention.

The invention will now be described in greater detail with reference to specific embodiments thereof.

A method of thermomechanical machining is therefore proposed characterized by that the surface of a workpiece to be removed by a cutting tool is preheated by a plasma arc, the anodic spot of the plasma arc being positioned in advance of the cutting tool.

Used as cutting tools are cutting tools fabricated from tungsten-cobalt or titanium-cobalt alloys, or powdered ceramic materials.

Workpiece preheating is effected by the plasma arc of a plasmatron, compressed air of 4 to 6 atmospheres in pressure being used as a plasmaforming gas.

A workpiece to be machined is mounted on a table or into a faceplate. The machine tool and the plasmatron are started and the cutting tool is introduced to the cutting zone.

According to the invention, heating parameters and positioning of the anodic spot of the plasma arc are selected depending on the required cutting conditions and the size of chip cut, such that the depth of heating would provide for better machinability of the workpiece material in the cutting zone, which makes it possible to increase the depth of cut.

In the case of using a plasma arc with a stationary anodic spot, the size of the anodic spot in terms of the width of cut is selected so that it would be less than this width by a value of from 1.2 to 2.5 the selected depth of cut.

If the size of the anodic spot in terms of the width of cut is more or less than the recommended one, the surface to be removed will be heated non-uniformly.

In the first case overheating of the width of surface to be removed will take place to result in faster wear of the cutting tool, the cutting tool also failing to completely cut the surface of metal preheated to a required temperature.

In the second case, or when the width of the anodic spot is less the recommended one, part of the workpiece metal wil be cut while not heated to the required temperature, which, likewise, will result in shorter life of the cutting tool.

The aforedescribed dependence of the size of the anode spot on the depth of cut is determined with considerations of the thermophysical properties of the metal being cut, particularly its heat conductivity, thermal capacity, phase transition temperatures, etc.

Machining efficiency is at its maximum if the width of cut substantially equals the width of the surface preheated to a temperature facilitating the machinability of the workpiece metal. When using a plasma arc with oscillating anodic spot, uniform heating of the surface to be cut and longer life of the cutting tool are attained when within one oscillation of the anodic spot the surface of the workpiece to be cut travels a path substantially equal to the size of the anodic spot if measured in the direction of cutting.

The plasma arc is positioned in the course of cutting such that its longitudinal axis would coincide with the direction of movement of the workpiece at an acute angle to its vector to provide for the maximum use of the heat power to heat the surface to be cut short of blowing the molten portion of the workpiece metal off the surface. In other words, most of the heat supplied by the plasma arc to the surface of the workpiece being machined is expended for heating the workpiece metal in the zone of cutting.

Described hereinbelow are specific examples for embodying the method of thermomechanical machining according to the invention.

EXAMPLE 1

A low-alloy steel workpiece was cut.
Dimensions of the workpiece:
 diameter, mm: 3,000
 height: mm: 600
 surface beating, mm: 45
The workpiece surface was covered with scum.
Heating conditions:
 plasma arc current, A: 320
 voltage, V: 120
 anode spot size, mm: 14
 distance from the anode spot to cutter, mm: 180±5
 inclination angle of the axis of the plasma gun: 75° to 90°
Cutting conditions:
 cutting speed, m/min: 60
 feed (depth of cut), mm/rev.: 2.4
 width of cut, mm: 20
A tungsten-cobalt alloy cutter was used. Cutter life before regrinding was 60 min.

EXAMPLE 2

A low-carbon steel workpiece was machined.
Workpiece dimensions:
 diameter, mm: 1,550
 height, mm: 1,600
 surface beating, mm: 40
The workpiece surface was covered with scum.
Heating conditions:
 plasma arc current, A: 300
 voltage, V: 120
 anode spot size, mm: from 23 to 25 distance from the anode spot to cutter, mm: 130±5
 inclination angle of the axis of the plasma gun: 80° to 90°
Cutting conditions:
 cutting speed, m/min: 45
 feed (depth of cut), mm/rev: 2.4
 width of cut, mm: 40
A titanium-cobalt alloy cutter was employed. Life of the cutter before regrinding was 60 min.

EXAMPLE 3

A casting for cold rolling was used as the workpiece (chrome-molybdenum steel).
Workpiece dimensions:
 diameter, mm: 680
 length, mm: 4,200
 surface beating, mm: 50
Conditions of heating:
 plasma arc current, A: 350
 voltage, V: 140 anode spot size, mm: from 32 to 34
distance from the anode spot to the cutter, mm: from 280° to 300°
inclination angle of the axis of the plasma gun: 60°
Cutting conditions:
cutting speed, m/min: 30
feed (depth of cut), mm/rev.: from 1.62 to 3.25
width of cut, mm: 40

A tungsten-cobalt alloy cutter was used. Cutter life before regrinding was 60 min.

EXAMPLE 4

A workpiece of high-strength titanium alloy was machined having a diameter 1,700 mm.
Heating conditions:
plasma arc current, A: 280
voltage, V: 100
diameter of the anode spot, mm: 12
distance from the anode spot to the cutter, mm: from 250 to 270
inclination angle of the axis of the plasma gun: 75°
amplitude of anode spot oscillations, mm: 24 frequency of oscillations, Hz: 50
Cutting conditions:
cutting speed, m/min: from 10 to 12
feed (depth of cut) mm/rev.: 1.8
width of cut, mm: 40

A tungsten-cobalt alloy cutter was employed. Life of the cutter before regrinding was 60 min.

EXAMPLE 5

A workpiece of 350 mm in diameter from a high-strength nickel based alloy was machined.
Heating conditions:
plasma arc current, A: 300
voltage, V: 100
anode spot size, mm: 4
distance from the anode spot to the cutter, mm: 120
inclination angle of the axis of the plasma gun: 80°
Cutting conditions:
cutting speed, m/min: 15
feed (depth of cut), mm/rev from 1.6 to 2.2
width of cut, mm: 8

A titanium-cobalt alloy cutter was employed. Cutter life before regrinding was 40 min.

EXAMPLE 6

A high-strength titanium alloy workpiece was machined.
Dimensions of the ring workpiece, mm: 2,500 by 300 surface beating, mm 25 mm
Heating conditions:
plasma arc current, A: 200±20
voltage, V: 120±10
size of the anode spot ahead of the cutter, mm: 250±10
inclination angle of the axis of the plasma gun: 45°
Cutting conditions:
cutting speed, m/min: from 8 to 10
feed (depth of cut), mm/rev: from 1.25 to 1.8
width of cut, mm: 25

A tungsten-cobalt alloy cutter was used. Cutter life before regrinding was 40 min.

EXAMPLE 7

A stainless workpiece was machined.
Workpiece dimensions:
diameter, mm: 3,300 by 2,800
height, mm: 300

The outer surface of the workpiece was subsequent to rolling off.
Heating conditions:
plasma arc current, A: 240±20
voltage, V: 120±10
anode spot size, mm: 12
inclination angle of the axis of the plasma gun: 45°
Cutting conditions:
cutting speed, mm/min: 40
feed (depth of cut), mm/rev.: 1.5
width of cut, mm: 25

A tungsten-cobalt alloy cutter was employed. Cutter life before regrinding was 45 min.

Figure 2:
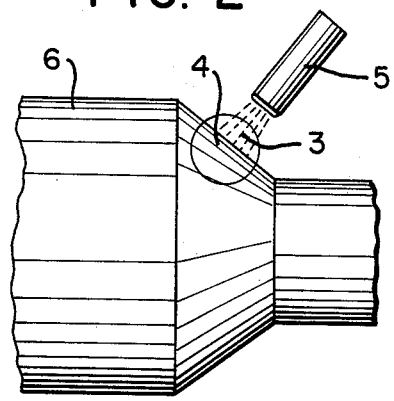
FIG. 2 is a fragmentary side view of the workpiece showing the orientation of the plasma arc relative thereto.
Figure 3:
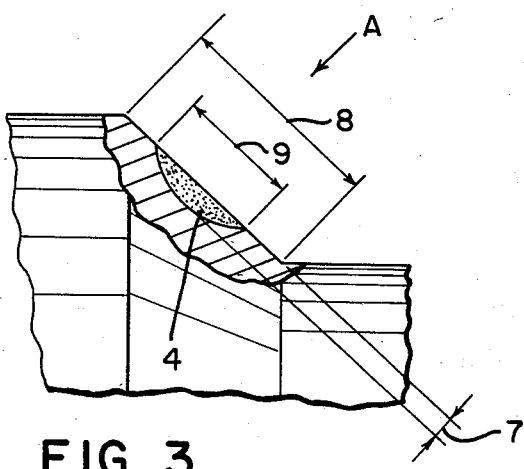
FIG. 3 is an enlarged fragmentary view, partially broken away and in section, showing the area to be cut off and the size of the anodic spot relative thereto.
Figure 4:
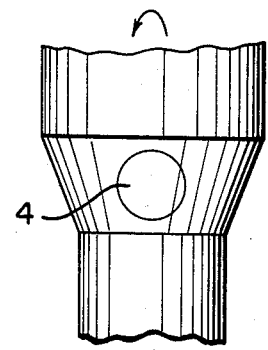
FIG. 4 is a fragmentary top view of the workpiece showing the position of the anodic spot with relation to the layer to be cut off from the workpiece.

As shown in the drawings, particularly FIGS. 1 and 2, a cutting tool 1 is provided to cut a layer 2 from a workpiece 6, which is shown in FIGS. 1 through 4 as a rotatable cylindrical workpiece. A plasma arc 3 is formed by a plasma generator 5, to provide an anodic spot 4 on the workpiece, in order to heat the spot to a heating depth 7, as shown more clearly in FIG. 3 of the drawings. The heating depth represents the thickness of the layer to be cut off. As illustrated in FIG. 3 the layer to be cut off has a width 8 and the size of the anodic spot is designated by reference numeral 9. FIG. 4 shows a top view of the workpiece and the position relative thereto of the anodic spot 4.

Figure 5:
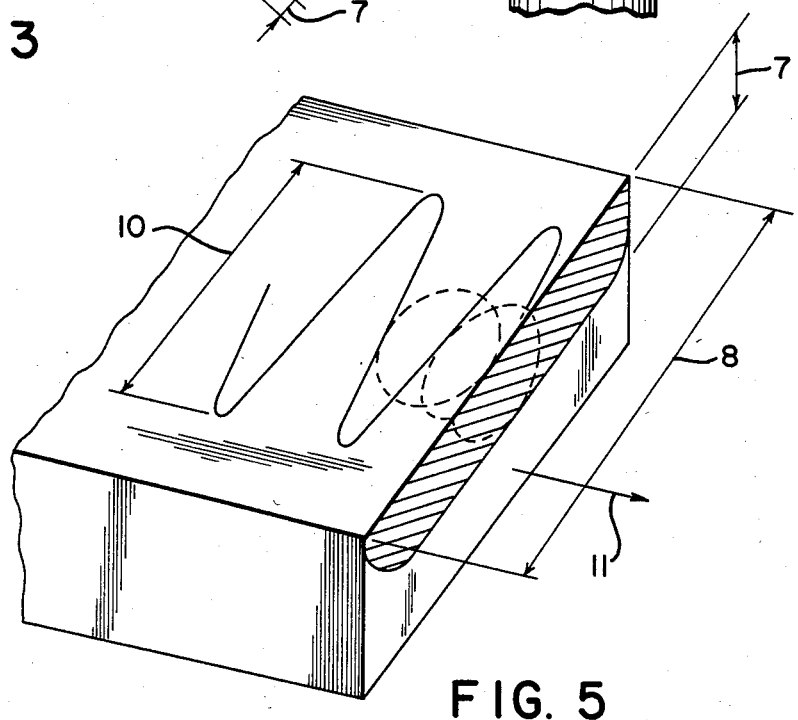
FIG. 5 is a fragmentary perspective view showing a linearly movable, flat workpiece with a heated surface area defined by an oscillating anodic spot.

FIG. 5 is a further embodiment of the method invention wherein the plasma generator is caused to oscillate transversely relative to the direction of workpiece movement 11 to provide a heated surface area 10, that is larger than the size of the anodic spot. In this further embodiment, the width 8 of the cut is greater than the amplitude 10 of the anodic spot oscillations by the sum of the values of the size of the anodic spot in the direction of the width of cut, and 1.2 to 2.5 times the depth of cut. The speed of cutting is preferably substantially equal to the product of the frequency of oscillation of the anodic spot by the size of the anodic spot in the direction of the width of cut. In FIG. 5, the amplitude of oscillation of the anodic spot is identified by reference numeral 10, in relation to the width 8 of the layer cut off, the heating depth 7, and the direction 11 of workpiece movement.

The heretofore cited examples show that the method according to the invention makes it possible to machine with high efficiency heavy out-of-balance workpieces rotating with a certain amount of eccentricity. The life of cutting tools used with the method is substantially extended.

In addition, the proposed method provides for machining such active metals as titanium and titanium alloys without chip self-inflammation.

The method also provides for cutting a greater width from workpieces through extending the zone of plasma arc heating by using an oscillating anode spot.

One more advantage of the method resides in that the increased depth of cut makes it possible to machine workpieces having surface defects, such as scum and scale, with the cutting tool life being practically unaffected.

INDUSTRIAL APPLICABILITY

The invention can find application for rough-machining high strength and hard metals, such as titanium and titanium alloys.

The invention can also be used for surface heat treatment. In this case the surface of a workpiece uniformly heated to a required temperature is cooled by a special-purpose device (sprayer) mountable in place of the cutting tool.

We claim:

1. A method of mechanical machining of metal workpieces using a cutter and a plasma arc to heat the cutting zone, comprising the steps of:

providing a plasma arc to define an anodic spot or a workpiece;

imparting a continuous movement at a constant speed to a workpiece relative to a plasma generator and a cutting tool;

preselecting the maximum depth and width of a metal layer to be cut off the workpiece in a cutting zone;

locating the anodic spot of the plasma arc on the workpiece surface in the cutting zone ahead of the cutting tool and heating the workpiece surface by the anodic spot;

forming a strip of heated metal layer on the workpiece surface in a zone smaller than the width of the layer to be cut off by the cutting tool by an amount equal to between 1.2 and 2.5 times the selected heating depth of the layer to be cut off;

locating the cutting tool at a distance from the anodic spot of the plasma arc equal to the product of the cutting speed and the heating time of the layer being cut off within the range of cut depth selected; and cutting the workpiece in the preselected cutting zone.

2. A method as claimed in claim 1, wherein the plasma arc is positioned so that its longitudinal axis forms an acute angle with a vector representing the direction of workpiece movement in the cutting plane.

3. A method as claimed in claim 1, wherein the strip of heated metal layer is formed by oscillating the plasma arc normally to the cutting direction, the cutting width selected to be larger than the oscillation amaplitude of the anodic spot by an amount equal to the sum of its diameter and 1.2 to 2.5 times the heating depth of the layer to be cut off, and the cutting speed determined as the product of the oscillation frequency of the anodic spot and the spot diameter.

* * * * *